Dec. 15, 1970   T. M. SMITH   3,548,209
METHOD OF DETERMINING POSITION OF WORKPIECE
ON A SUPPORTING FIXTURE
Filed March 7, 1968
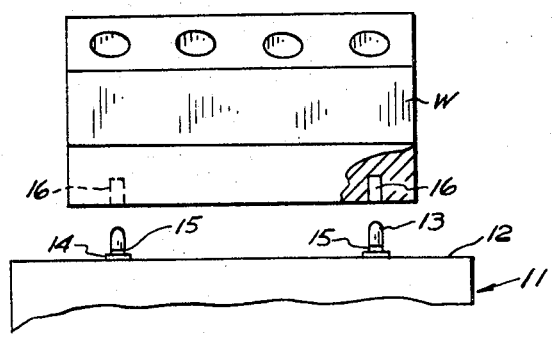
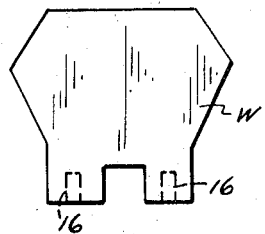
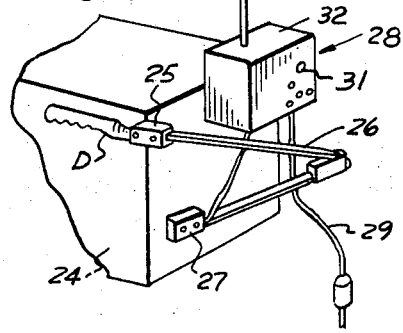
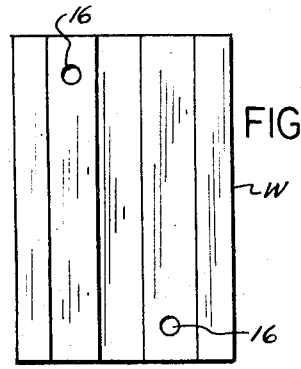
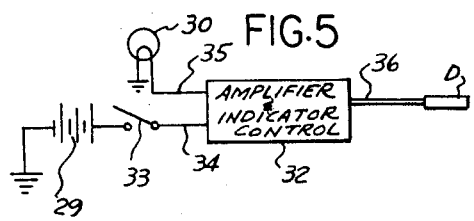
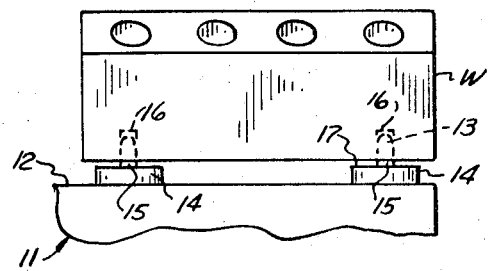
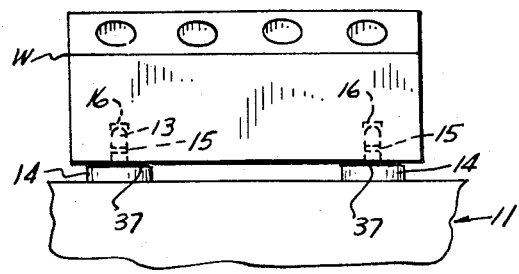
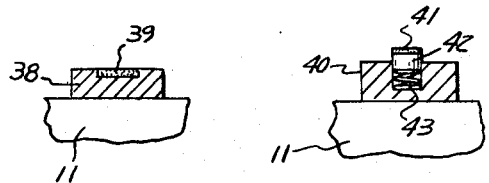
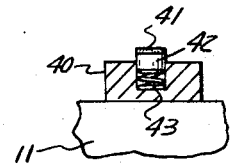
INVENTOR
THEODORE M. SMITH
BY Sullen, Sloman, & Cantor
ATTORNEYS

United States Patent Office 3,548,209
Patented Dec. 15, 1970

3,548,209
METHOD OF DETERMINING POSITION OF WORK-PIECE ON A SUPPORTING FIXTURE
Theodore M. Smith, 15639 W. McNichols Road,
Detroit, Mich. 48235
Filed Mar. 7, 1968, Ser. No. 711,395
Int. Cl. G21h 5/02
U.S. Cl. 250—106          11 Claims

ABSTRACT OF THE DISCLOSURE

The method of providing a detection system for the improper location of a workpiece upon the bed of a fixture for a machine tool operation which consists of mounting upon locating pins projecting from the fixture bed a radioactive element; the providing of locating holes within portions of the workpiece for such arrangement that upon correct location of the workpiece the radioactive element upon the locating pins is completely enclosed shielding the radioactive element, and wherein improper location of the workpiece relative to the pins unshields the radioactive element so that the rays therefrom are adapted to activate a radiation detection signal system.

---

The present invention relates to the use of radioactive isotopes in the method of detecting improper location of work pieces upon a supporting fixture for a machine tool operation.

In the machine tool industry or in any production line wherein machining operation is applied to a work piece such as in an automation line it is highly important that the work piece be properly located with respect to a predetermined reference surface or part of the supporting fixture in order to have a properly located machining operation or plurality of machining operations or drilling operations or the like.

Heretofore, for this purpose there are normally employed upon the fixture a plurality of properly spaced locating pins normally adapted to project up into corresponding apertures formed within the work piece. Very often in automation lines and the like in spite of the said locating pins, the work piece does not always properly register therewith with the result that machining occurs at the wrong point on the work piece.

It is therefore an object of the present invention to provide upon the said locating pins of a fixture which receives correspondingly located apertures in a work piece, the radioactive element so that when the work piece is properly located with respect to said pins the radioactive element is protectively enclosed and shielded and wherein upon improper location of the work piece relative to the pins, the said radioactive element is unshielded so that the rays therefrom are adapted to activate a radiation detection signal system.

It is therefore an object of the present invention to provide upon the said locating pins projecting from the fixture or bed adapted to receive a work piece of the radioactive element which may be in the form of a coating or in ring form or otherwise applied to the locating pin in such manner that upon proper location of the work piece with respect to the said pins for proper registry for a machining operation, the said radioactive element will be completely shielded by the work piece and conversely on improper location of the work piece will be unshielded to the extent that escaping rays from the radioactive element will activate a radiation detection signal system in time to provide for relocation of the work piece with respect to its supporting fixture and to thus assure a correct machining operation and to prevent spoilage or damage to a work piece.

It is thus another object in connection with the present improper location of work piece detection system to provide a signal mechanism which is audible and/or visible by which the equipment and machine tool operation can be interrupted to permit relocation of the work piece as required and to prevent damage thereto.

These and other objects will be seen from the following specification and claims in conjunction with the appended drawing in which:

FIG. 1 is a fragmentary partially broken away and sectioned elevational view of the fixture and locating apparatus in accordance with the present method, and showing exploded view of the work piece relative to the locating means prior to assembly thereover.

FIG. 2 is an end elevational view of the work piece.

FIG. 3 is a bottom plan view thereof.

FIG. 4 is a fragmentary perspective view of said system as employed in the present method.

FIG. 5 is a schematic wiring diagram for the radiation detection signal system.

FIG. 6 is a view similar to FIG. 1 with the work piece improperly assembled upon the locating pins.

FIG. 7 is similar to FIG. 6, illustrating a modified method using rest pads.

FIGS. 8 and 9 are fragmentary elevational views of modified rest pads respectively.

Referring to the drawing a work supporting fixture 11 is fragmentarily shown, FIGS. 1 and 6, having a top support bed 12 and at least a pair or more of upwardly extending locating pins 13 which project from the locating pads 14 anchored upon bed 12.

Applied to the respective pin 13 adjacent pad 14 there is provided a radioactive element 15 in the form of a thin ring impregnated with a radioactive substance as hereafter described or which substance or material may be applied to the locating pin adjacent the locating pad 14 having work piece locating top surfaces 17 with respect to which the work piece W is movably located. Said work piece in the illustrative embodiment may be a vehicle engine block to which a machining operation is to be applied when the work piece has been properly located upon the fixture 11 with respect to the pins 13 and suitably clamped in place in a manner not shown.

Formed within the undersurface of the work piece W there are provided a corresponding plurality of properly located and properly sized pin receiving apertures 16 adapted for cooperative assembly over locating pins 13 in such manner that when properly located the said block properly encloses protectively the radioactive element 15 shielding the same from the outside. The illustrative embodiment shown in FIG. 6, the work piece W is not so properly located with the result that portions of the radioactive element 15 are exposed and thus adapted to by emission of rays of the said radioactive element activate a radiation detection signal system such as shown at 28, FIG. 4.

In one form of the present invention, the radioactive element may be in the form of a radioactive ring as at 15, FIG. 1, fixedly adhered or secured or applied to locating pins 13 at their base and adjacent the pad 14. Such ring 15 may be rendered radioactive by the use of any one of a group of radioactive isotopes of low radiation value up to approximately 500 microcuries, more or less, for illustration, but not by way of limitation.

With the work piece W properly registering with the locating pins 13 relative to the correspondingly located apertures 16 in the said work piece, the said work piece acts as a shield so as to overlie and protectively enclose the radioactive rings or elements 15 preventing emission of radioactive rays.

As a part of the present method as a final step in the event that the work piece is not correctly located, being the primary object of the present method, the said radioactive isotope impregnated ring 15 or radioactive material is exposed as in FIG. 6 so that the rays therefrom are adapted to activate the radiation detector D of which there may be one or more. Such detector, FIG. 4, is universally mounted as at 25 upon the articulated support elements 26, which are flexibly anchored as at 27 upon support 24 fragmentarily shown. Accordingly, detector D is adapted for universal movement as desired for correct setup and positioning.

The present detection unit includes electronic mechanism forming no part of the present invention, but includes power source 29 for connection thereto with signal light 30, which could also include an audible signal, if desired, and a reset button 31.

The Geiger tube type of detector 28 senses the exposure of the radioactive element 15 whenever there is an improper location of the workpiece W with respect to fixture 11–12.

The increase in detector count rate causes the electronic circuitry to deflect a meter relay in the detection system, generally indicated at 28 which may include, as shown in FIG. 5 schematically, an amplifier and an indicator control 32 in an electrical circuit which forms no part of the present invention, for activation of the alarm relay assembly in turn energizing the alarm light 30 or other audible signal.

An illustration of the circuitry would be employed including the lead 36 from detector D directed to the amplifier indicator control 32 which through lead 34 and switch 33 is connected to power source 29 suitable grounded.

The additional lead 35 from the amplifier and indicator control 32 connects the signal light 30 as shown schematically, and as illustrative of one means by which the present detection system functions.

The electronic parts such as generally designated at 28 or the type of circuitry shown in FIG. 5 are provided and sold by Eberline Instrument Company and others, the circuitry and construction thereof forming no part of the present method or apparatus by which the present method is effected.

In the illustrative embodiment a sealed source of radioactive radiation should be such that one-quarter of an inch, for illustration, of the metal shield or other equivalent shield such as the workpiece W in the present embodiment of the method will give an alternation of approximately 1000.

There is thus employed in connection with the radioactive ring 15 beta radiation or low energy gamma radiation. Sources of these may be as follows:

Strontium–90
    Cerium–144
    Krypton–785
    Thallium–204
    Radium D
    Radium E by way of illustration only and not by way of limitation, since it is contemplated that other nuclides may be suitable for this purpose in the low energy range.

The method disclosed of the present invention provides for the use of radioactive isotopes in the form of a radioactive element applied to locating pins upon a tool fixture normally shielded upon correct assembly of the workpiece, upon the said fixture and upon incorrect assembly unshielded sufficiently as to activate a radiation detection signal system to indicate such improper location. The present steps of the method are as follows:

(1) Mounting upon locating pins 13 the radioactive element.
(2) Providing locating holes 16 within portions of the workpiece of such shape, size and arrangement that upon correct location of the workpiece with respect to the fixture 11–12, the radioactive element is protectively enclosed by the workpiece W, normally shielding the radioactive element.
(3) Finally, improper locating of the workpiece relative to the said pins causing unshielding of the radioactive element 15, the rays of said radioactive element adapted to activate a radiation detection signal system 28, FIG. 4.

The radioactive element designated generally at 15 could be any by-product material which incorporates atomic numbers in any range, in the low energy group preferably and, by way of illustration, up to 500 microcuries, but not limited thereto.

MODIFICATION

In FIG. 7, fixture 11 is similar to FIG. 6 and mounts pads 14 having upon their top surfaces a radioactive plate or strip 37 or which could be a layer of radioactive material, of the nature above described.

The proper registry of workpiece W over pads 14 masks and shields the radioactive element 37, with the result that the radiation detection system 28 is not activated. Thus, for example, with improper registry work W upon a Z axis or vertical plane, the detection system is activated.

In conjunction with this modification, it is contemplated that pins 13 may also project from the pads 14 the same as shown in FIG. 6 and these pins could have a ring or strip of radioactive material 15 thereon, similar to what is shown in FIG. 6 and adapted for registry within undercut apertures 16 in the workpiece W.

While pins 13 and apertures 16 may normally be used for correct orientation of the workpiece with respect to the supporting fixture, for example, on an X–Y axis, i.e. in a horizontal plane the same as above described with respect to FIGS. 1 and 6, such usage of the pins for registry on an X–Y axis may be employed in conjunction with the radioactive strip or element 37 on pads 14 for registry in a third right angularly related plane or Z axis as desired. Furthermore, in the event correct registry is required only on the Z axis or vertical plane, then the radioactive impregnated strips 37 on pads 14 are sufficient and can be used independent of the pins 13 when required.

A modified workpiece supporting pad for assuring registry in a vertical axis is shown in FIG. 8 as well as in FIG. 9. In FIG. 8 the pad 38 applied to fixture 11 fragmentarily shown includes a recessed slot in its top surface within which is inserted as at 39, a disc or element which is radioactive or radioactive impregnated and whose top surface is flush with the pad 38.

In FIG. 9, a slightly different form of pad 40 is provided upon fixture 11 which has an upwardly opening bore within which is movably mounted the disc or piston 42 spring biased outwardly at 43 and mounting upon its top surface a radioactive strip or disc or button 41. On application of the workpiece to the top surface of a pair of pads 40, for example, the assembly 41, 42 would be projected down into the bore of the pad and the radioactive element 41 completely shielded and thus no activation of the radiation detection signal system 28. Conversely, in the absence of proper registry of the workpiece with respect to the pads 38 or 40, or radioactive element 37, FIG. 7; 39, FIG. 8; or 41, FIG. 9, will be partly exposed and thus the radiation detection signal system 28 will be activated to show improper registry and the signal 30 activated.

Having described my invention, reference should now be had to the following claims.

I claim:
1. The method of providing a detection system for the improper location of a work piece upon the bed of a fixture for a machine tool operation which consists of:
    mounting upon locating pins projecting from the fixture bed a radioactive element;

providing locating holes within portions of the work piece of such shape, size and arrangement that upon correct location of the work piece, the radioactive element is protectively enclosed by the work piece, normally shielding the radioactive element;

improper locating of the work piece relative to said pins unshielding said radioactive element, the rays of said radioactive element adapted to activate a radiation detection signal system.

2. In the method of claim 1, the radioactive element being selected from the group consisting of beta radiation, and low energy gamma radiation.

3. In the method of claim 1, the radioactive element being selected from the group consisting of strontium–90, cerium–144, krypton–185, thallium–204, radium D, and radium E.

4. In the method of claim 1, said radioactive element consisting of any by-product material with atomic numbers in any range.

5. In the method of claim 1, said radioactive element containing up to 500 microcuries.

6. In the method of claim 1, said radioactive element being in the form of a ring impregnated with radioactive material and mounted over a locating pin.

7. In the method of claim 1, said radioactive element being in the form of a cover layer applied to the locating pin, said layer impregnated with a radioactive material.

8. In the method of claim 1, registry of said locating pins and holes determining relative location of the work piece and fixture on an X–Y axis in a first plane; and the further step of mounting upon locating pads on a fixture bed of a radioactive strip, upon correct location of the work piece relative to said pads upon a Z axis in a second right angularly related plane, the radioactive strip is protectively enclosed by the work piece, normally shielding said strip; improper location of the work piece relative to said pads unshielding said strip, the rays of said radioactive strip adapted to activate a radiation detection signal system.

9. In the method of claim 1, said radioactive strip being nested down into said pad flush with its top surface and adapted to be covered and shielded by said work piece.

10. In the method of claim 8, said radioactive strip being movably mounted upon and above said pad and yieldedly movable down thereinto adapted to be covered and shielded by said work piece.

11. The method of providing a detection system for the improper location of a work piece upon a bed of a fixture for a machine tool operation which consists of:

mounting upon locating pads projecting from the fixture bed a radioactive element;

registering the undersurface of the work piece against and over said radioactive element and pads whereby the latter are protectively enclosed by the work piece, normally shielding the radioactive elements;

improper location of the work piece relative to said pads unshielding said radioactive element, the rays of said radioactive element adapted to activate a radiation detection signal system.

References Cited
UNITED STATES PATENTS

| | | | |
|---|---|---|---|
| 3,158,028 | 11/1964 | Chope | 250—83.3X |
| 3,235,726 | 1/1966 | Haller | 250—106X |
| 3,300,770 | 1/1967 | Brousseau et al. | 250—222X |

ARCHIE R. BORCHELT, Primary Examiner

M. J. FROME, Assistant Examiner

U.S. Cl. X.R.
250—83.3; 33—180